United States Patent
Maruyama

(10) Patent No.: US 8,422,351 B2
(45) Date of Patent: Apr. 16, 2013

(54) OPTICAL DISK APPARATUS AND DRIVING METHOD THEREOF

(75) Inventor: Hideki Maruyama, Yokohama (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 1285 days.

(21) Appl. No.: 11/529,070

(22) Filed: Sep. 27, 2006

(65) Prior Publication Data

US 2007/0253309 A1 Nov. 1, 2007

(30) Foreign Application Priority Data

Apr. 27, 2006 (JP) ................................ 2006-122872

(51) Int. Cl.
*G11B 7/00* (2006.01)

(52) U.S. Cl.
USPC ................. 369/112.01; 369/112.24; 720/601; 720/681; 720/648; 720/685; 720/687; 720/682; 720/683; 720/686

(58) Field of Classification Search .................... None
See application file for complete search history.

(56) References Cited

U.S. PATENT DOCUMENTS

| | | | | |
|---|---|---|---|---|
| 5,910,937 A * | 6/1999 | Akiba et al. | ................. | 369/53.2 |
| 2002/0150016 A1 | 10/2002 | Yasuda et al. | | |
| 2004/0042353 A1 * | 3/2004 | Kikkoji | ....................... | 369/30.36 |
| 2006/0098540 A1 * | 5/2006 | Ando | ......................... | 369/44.41 |
| 2006/0098556 A1 * | 5/2006 | Tanner | ..................... | 369/124.01 |
| 2006/0098558 A1 * | 5/2006 | Kobayashi et al. | ........ | 369/275.1 |
| 2006/0163459 A1 * | 7/2006 | Park et al. | ................ | 250/231.13 |
| 2006/0193217 A1 * | 8/2006 | Mori et al. | ................. | 369/44.23 |
| 2007/0177469 A1 * | 8/2007 | Imagawa | ................... | 369/44.23 |
| 2007/0201334 A1 | 8/2007 | Kay | | |

FOREIGN PATENT DOCUMENTS

| | | |
|---|---|---|
| JP | 07-057275 A | 3/1995 |
| JP | 10-055601 A | 2/1998 |
| JP | 2002-373441 A | 12/2002 |
| JP | 2003-045068 A | 2/2003 |
| JP | 2005-235346 | 9/2005 |
| JP | 2005235346 * | 9/2005 |
| JP | 2007-226941 a | 9/2007 |

OTHER PUBLICATIONS

Japan Patent Office office action for patent application JP2006-122872 (Jul. 27, 2010).
Japan Patent Office office action for patent application JP2006-122872 (Mar. 22, 2011).

* cited by examiner

*Primary Examiner* — Joseph Haley
*Assistant Examiner* — Ifedayo Iluyomade
(74) *Attorney, Agent, or Firm* — Kilpatrick Townsend & Stockton LLP

(57) ABSTRACT

An optical disc apparatus records information onto plural disc shaped mediums of different standards or reproduces information from the plural disc shaped mediums. The optical disc apparatus includes an optical pickup equipped with a spherical aberration correcting unit using a movable lens, and a disc insertion unit for inserting and ejecting the disc shaped mediums. The spherical aberration correcting unit starts the movement of the movable lens to an initial position while the disc insertion unit inserts or ejects the disc shaped medium. As such, the present invention discloses the optical disc apparatus with a reduced disc recognition time for improving user convenience and a driving method thereof.

11 Claims, 6 Drawing Sheets

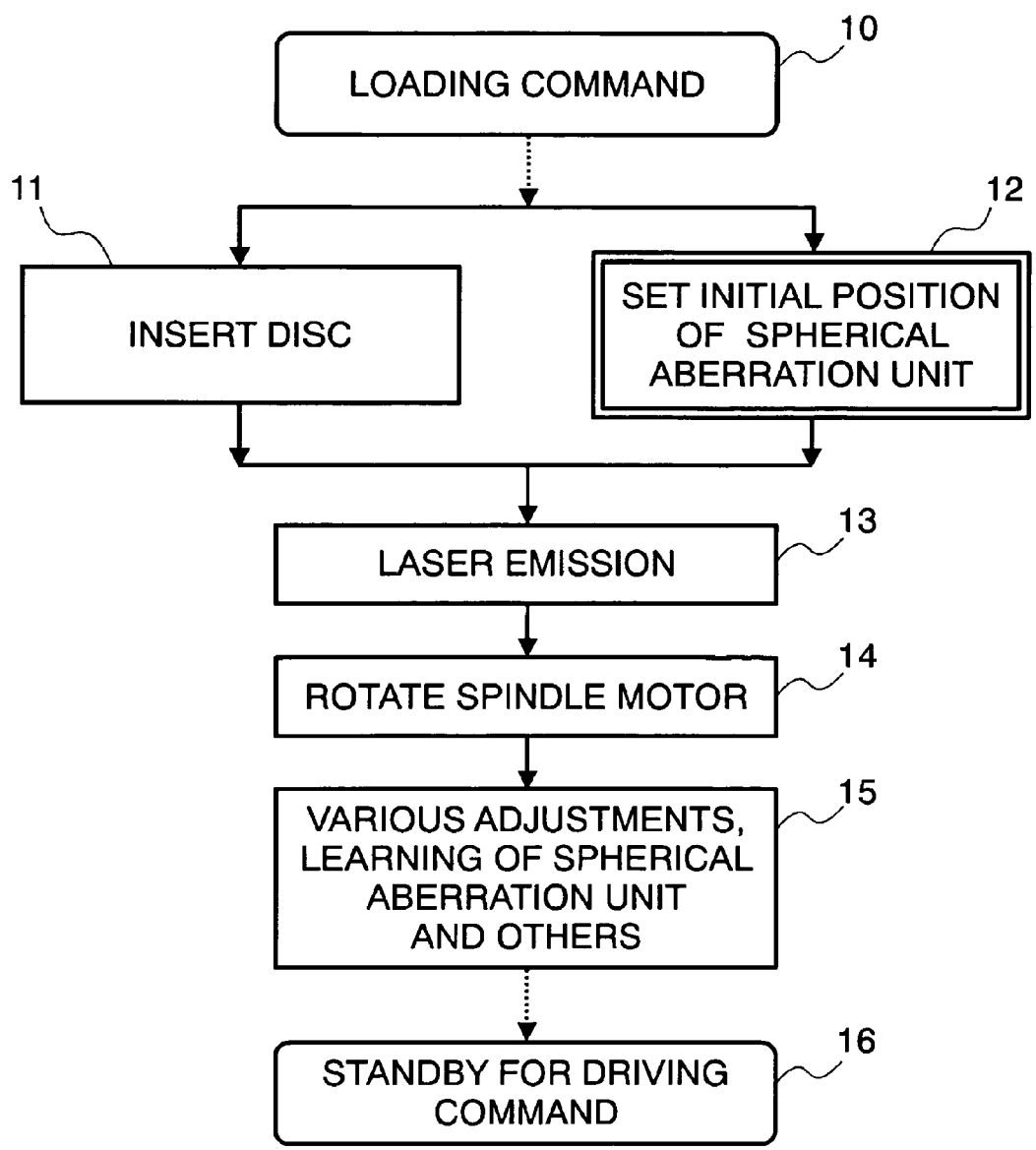

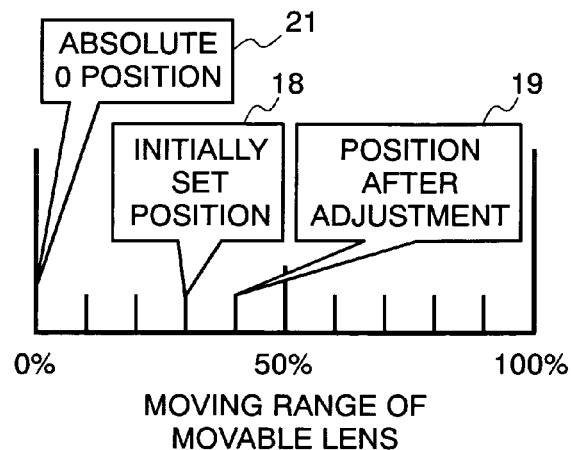
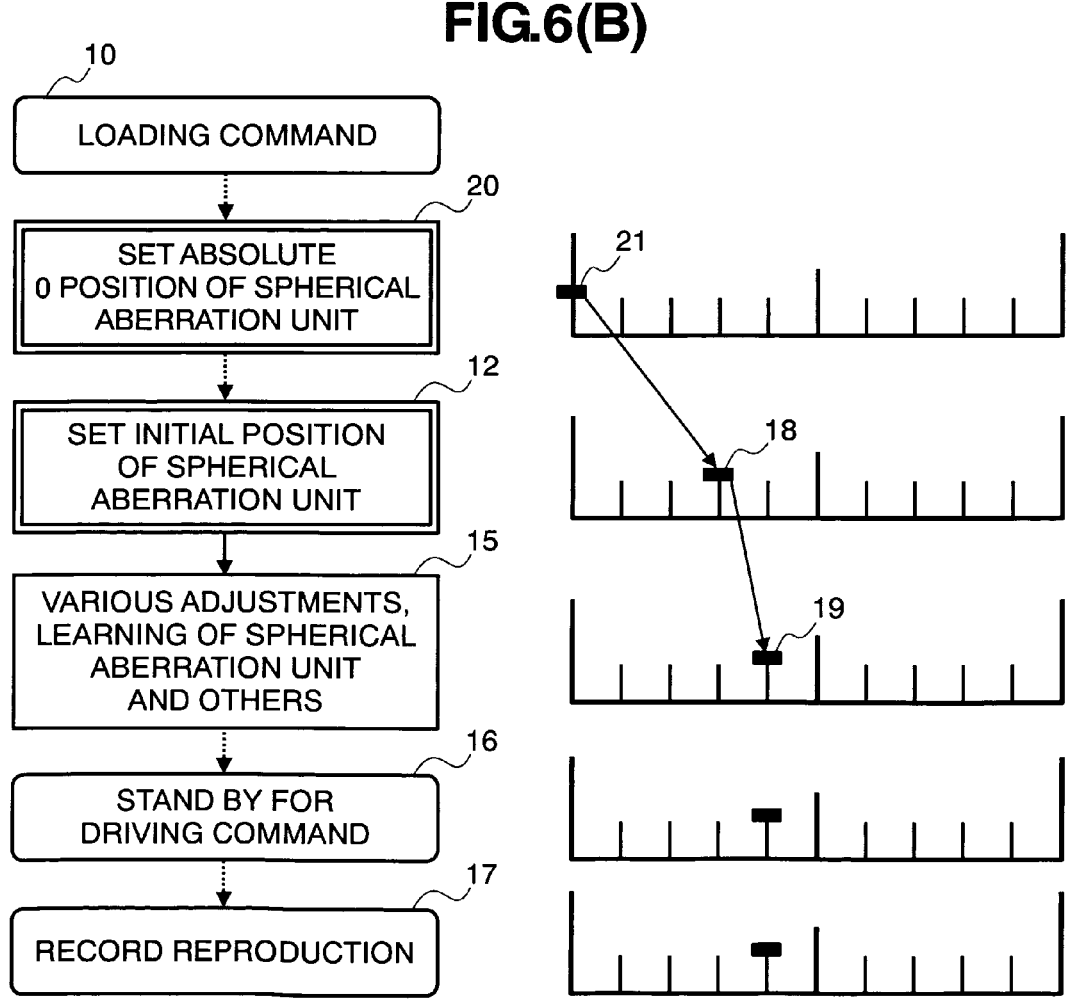

OPTICAL DISK APPARATUS AND DRIVING METHOD THEREOF

CLAIMS OF PRIORITY

The present application claims priority from Japanese application JP 2006-122872, filed on Apr. 27, 2006, the content of which is hereby incorporated by reference into this application.

BACKGROUND

The present invention relates to an optical disc apparatus equipped with a spherical aberration correction unit using a movable lens and a driving method thereof.

As an optical disc apparatus using an optical pickup with spherical aberration correcting means, Japanese Patent Laid-Open No. 2005-235346 discloses an optical disc drive unit performing a feed-forward control, in which a movable lens of a spherical aberration correcting optical system is moved and stopped at an initial position based on initial setting information corresponding to a first recording medium stored previously in a memory of the aberration correcting control means at the time of applying a power source of the optical disc driving apparatus.

SUMMARY

Optical discs are manufactured in diverse standards with different recording and reproducing capacities, depending on wavelength of a laser, disk substrate thickness, light spot diameter, servo control method and the like. In an aspect of increasing user convenience, optical disc apparatuses based on such optical discs of diverse standards are required. Meanwhile, in an aspect of manufacturing costs, an optical pickup with a single objective lens is more advantageous than an optical pickup with plural objective lenses.

However, when the optical system is taken into consideration, using the same objective lens between lasers with different wavelengths only increases the influence of a spherical aberration. The spherical aberration problem can be resolved by mounting a spherical aberration correcting equipment (hereinafter it will be referred to as a "spherical aberration correcting unit") using a movable lens in an optical pickup. Moreover, generally if a light spot size decreases (which increases recording and reproducing capacities), the influence of the spherical aberration increases and thus, a technology for correcting the increased spherical aberration becomes very important and even an apparatus of the single standard is in need of such technology.

Although the spherical aberration correcting unit using a movable lens may be driven in diverse methods, each of them accompanies physical movements, each taking a certain amount of time to manage the movements required. For instance, compared to an apparatus without any spherical aberration correcting unit, a conventional optical disc driving apparatus provided with a spherical aberration correcting unit requires an extra time for setting an initial position of a movable lens in the unit before even recognizing a disc, resultantly reducing user convenience.

Because the optical disc driving apparatus provided with a spherical aberration correcting unit spends a designated amount of time to set a predetermined initial position of a movable lens in the unit, it has been a problem that extra time is required for recognizing a loaded disc.

Therefore, the present invention has been made in view of the above problems, and it is an object of the present invention to provide an optical disc apparatus featuring shortened disc recognition time for improving user convenience.

In accordance with an aspect of the present invention, the above and other objects can be accomplished by the provision of an optical disc apparatus and a driving method thereof.

The optical disc apparatus of the invention records information on plural disc-shaped recording mediums of different sizes, or reproduces information from the plural disc-shaped recording mediums. The optical disc apparatus comprises an optical pickup mounted with a spherical aberration correcting unit using a movable lens, and a disc insertion unit for inserting and ejecting the disc-shaped recording mediums.

In an optical disc apparatus according to a first aspect of the present invention, the spherical aberration correcting unit starts the movement of the movable lens to an initial position while the disc insertion unit inserts or ejects the disc shaped medium.

An optical disc apparatus according to a second aspect of the present invention comprises: an optical pickup equipped with a laser light source and a spherical aberration correcting unit using a movable lens; and a disc insertion unit for inserting and ejecting the disc shaped mediums, wherein the spherical aberration correcting unit moves the movable lens to an initial position within the period between start of the disc insertion by the disc insertion unit and start of the laser beam emission of the laser light source.

An optical disc apparatus according to a third aspect of the present invention comprises: an optical pickup equipped with a spherical aberration correcting unit using a movable lens; and a disc insertion unit for inserting and ejecting the disc shaped mediums, wherein the apparatus stores a position of the movable lens in the spherical aberration correcting unit during the ejection of the disc shaped medium, and carries out the initial position setting of the movable lens by a difference between the stored position at the time of the disc ejection and the initial position.

An optical disc apparatus according to a fourth aspect of the present invention comprises: an optical pickup equipped with a spherical aberration correcting unit using a movable lens; and a disc loading/removing unit for loading/removing the disc shaped mediums, wherein the spherical aberration correcting unit starts the movement of the movable lens to an initial position while the disc loading/removing unit loads the disc shaped medium in the apparatus.

A fifth aspect of the present invention provides a driving method of an optical disc apparatus for recording information onto a first recording medium of a first standard and a second recording medium of a second standard, or reproducing information from the first recording medium and the second recording medium. The optical disc apparatus comprises an optical pickup equipped with a spherical aberration correcting unit using a movable lens; and a disc loading/removing unit for loading/removing the first recording medium and the second recording medium. The driving method of the optical disc apparatus includes the steps of: ejecting, in the disc loading/removing unit, the first recording medium finished with information recording or information reproduction from the optical disc apparatus; and while the second recording medium is loaded in the optical disc apparatus, moving the movable lens in the spherical aberration correcting unit to a position for recording/reproducing information onto/from the second recording medium.

BRIEF DESCRIPTION OF THE SEVERAL VIEWS OF THE DRAWINGS

The above and other objects, features and other advantages of the present invention will be more clearly understood from the following detailed description taken in conjunction with the accompanying drawings, in which:

FIG. 2 is a flow chart describing a disc loading process for the optical disc apparatus of the present invention;

FIG. 6A is yet another conceptual diagram showing the position of a movable lens in the spherical aberration correcting unit, and FIG. 6B diagrammatically shows positions of the movable lens in each step of the disc loading process.

DESCRIPTION OF THE PREFERRED EMBODIMENTS

A preferred embodiment of an optical disc apparatus and a driving method thereof will now be described hereinafter.

Figure 1:
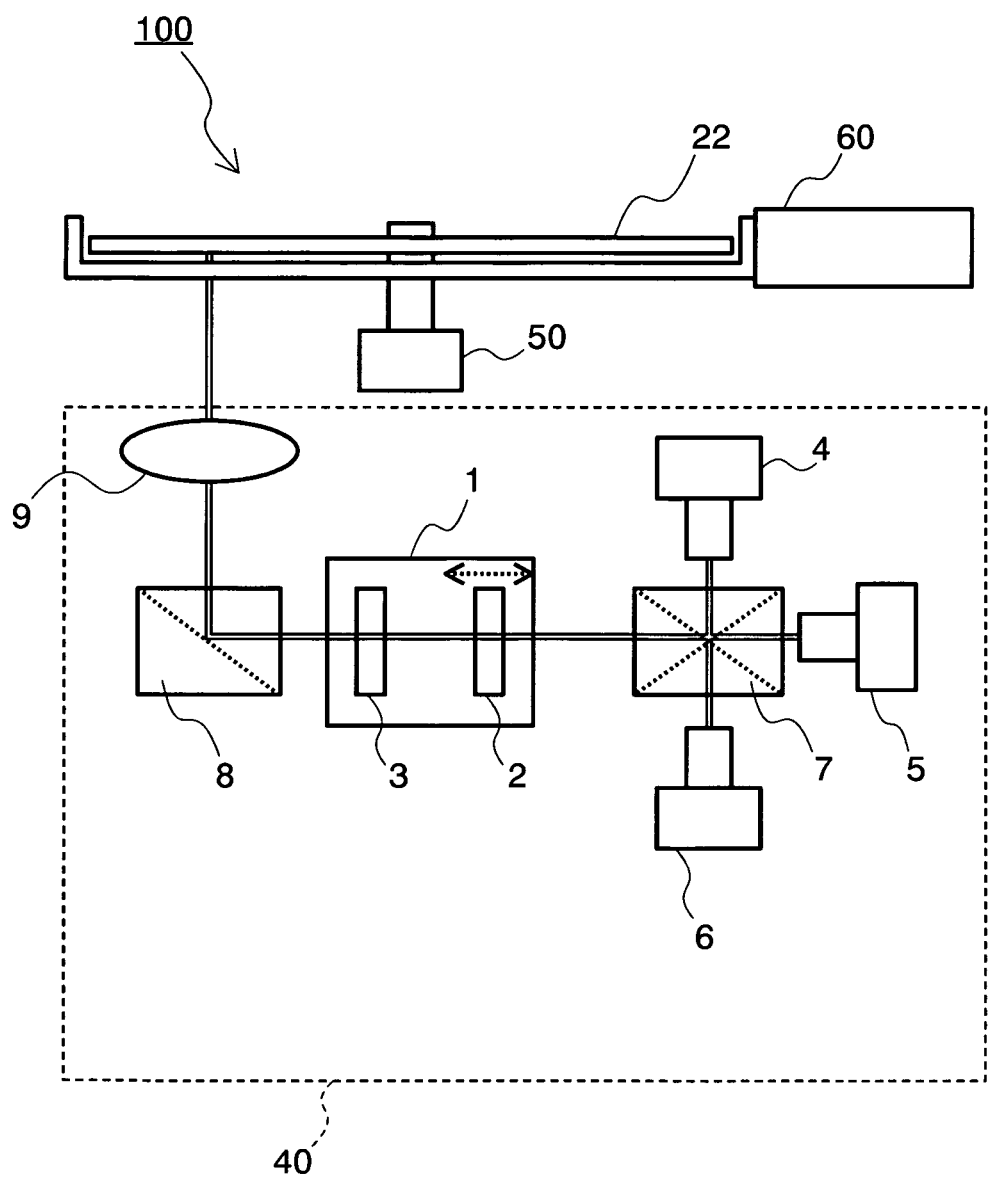
FIG. 1 is a schematic diagram of an optical disc apparatus having an optical pickup with aspherical aberration correcting unit, in accordance with the present invention.

FIG. 1 is a schematic view of an optical disc apparatus according to the present invention. The optical disc apparatus 100 includes an optical pickup 40, a disc rotating device 50, and a disc insertion unit 60. The optical pickup 40 includes a spherical aberration correcting unit 1, three laser beam emitting units 4, 5 and 6 for emitting laser beams of different wavelengths, a separator 7, a prism 8, and an objective lens 9. The laser beam emitting units 4, 5 and 6 emit laser beams of different wavelengths, depending on the sizes of optical discs being used. For example, if an optical disc apparatus is mounted with three types of mediums consisting of a BD (Blu-ray Disc), a DVD and a CD, the laser beam emitting units 4, 5 and 6 are formed of laser sources with oscillating wavelengths of about 405 nm, about 650 nm (or 635 nm), and about 780 nm.

Laser beams emitted from the laser beam emitting units 4, 5 and 6 pass through the separator 7, are incident on the spherical aberration correcting unit 1, are refracted through the prism 8 by 90 degrees, and are irradiated onto the disc 22 by the objective lens 9. In detail, spherical aberration of the laser beams having passed through the separator 7 is corrected by a fixed lens 3 and a movable lens 2 mounted in the spherical aberration correcting unit 1. The movable lens 2 inside the spherical aberration correcting unit 1 moves in the optical axis direction by a piezo actuator or a stepping motor (not shown). The optical pickup is controlled by a control device (not shown), and moves along the outer/inner circumferences of the disc 22 by a guide feed and a slider motor (not shown).

The optical disc 22 is inserted into the inner circumference of the optical disc apparatus by the disc insertion unit 60, and records or reproduces information.

The following will now explain in detail a disc loading device of the optical disc apparatus 100 according to the present invention. FIG. 2 is a flow chart describing a disc loading process for the optical disc apparatus 100 of the present invention. When the optical disc apparatus 100 receives a loading command 10 through a user's operation on a disc load switch or a loading command from the backend side of a host personal computer or an AV recorder, it proceeds to a disc insertion (S11), inserting an optical disc into the optical disc apparatus. Hereinafter, the user, the host PC, and the backend of an AV recorder will be collectively called the host.

Next, without checking whether the disc is completely inserted, the optical disc apparatus 100 performs a position setting step (S12) moving the movable lens 2 inside the spherical aberration correcting unit 1 to an initial position. The spherical aberration correcting unit 1 sets the movable lens 2 to the initial position and then, moves the lens 2 to a predetermined position for adjusting or correcting (hereinafter referred to as a "position after adjustment) the position of the movable lens according to unevenness of the apparatus.

The optical disc apparatus 100 carries out the emission of a laser beam (S13) and the rotation of a spindle motor (S14). The optical disc starts rotating since it is already chucked to the spindle motor at the time of the disc insertion (S11). Next, in correspondence to the unevenness of the loaded optical disc, a servo system and/or a signal processing system inclusive of the movable lens and others in the spherical aberration correcting unit are adjusted and learned (S15), and enters standby mode until a predetermined operation command is received from the host (S16). Here, the operation command involves data recording or data reproduction for example.

Although the spherical aberration correcting unit 1 depends on structure, moving distance, temperature, etc., to physically move the movable lens 2, it usually takes about 1 second to completely move the movable lens 2. Here, the disc insertion (S11) implies a process that a tray is inserted into the optical disc apparatus of a tray loading system (an optical disc is loaded into the tray to carry out data recording or data reproduction), and typically takes about 2 seconds. Besides the tray loading system, there is a slot loading system (slot-in system) in which a disc is inserted into a slit formed in the optical disc apparatus and is taken into the apparatus. This system also spends several seconds until the disc is completely inserted into the apparatus.

For a disc loading process in a conventional optical disc apparatus, the disc insertion and the initial position setting of the movable lens in the spherical aberration correcting unit are performed sequentially and independently, so approximately three seconds are spent to complete these two steps.

On the other hand, for a disc loading process in the optical disc apparatus of FIG. 1 of the present invention, the initial position setting (S12) of the movable lens in the spherical aberration correcting unit is carried out concurrently with the disc insertion (S11). Therefore, the initial position setting (S12) of the movable lens in the spherical aberration correcting unit looks as if the initial position setting (S12) is omitted, and the two steps, that is, the disc insertion (S11) and the initial position setting (S12) of the movable lens, are carried out within about 2 seconds which corresponds to the time required for the disc insertion (S11). In this way, the optical disc apparatus of the present invention can emit laser beams immediately after a disc is inserted. Following the laser beam emission, the optical disc apparatus of the present invention rotates the spindle motor to rotate the optical disc, and discriminates the disc. Alternatively, after the laser beams are emitted, the disc discrimination may be finished before the disc rotation.

In the invention, the initial position of the movable lens in the position setting step (S12) indicates a predetermined position of the movable lens that is initially set in the spherical aberration correcting unit. The position of the movable lens in the spherical aberration correcting unit is changeable according to optical disc formats. When data is recorded/reproduced onto/from an optical disc with a different format from a given optical disc, the position of the movable lens in the spherical aberration correcting unit is changed. Therefore, in case of an optical disc apparatus based on optical discs of plural standards, the movable lens in the spherical aberration correcting unit is first positioned at a reference position of an optical disc of a certain standard, and a laser beam is irradiated onto the optical disk while the disc is rotated to discriminate whether the optical disc is of the corresponding standard. If the optical disc is not of the standard of interest, the movable lens is moved to another reference position for recording/reproducing information onto/from an optical disc of different standard and the disc discrimination step is repeated. The initial position where the movable lens is first positioned may be selectively set among plural reference positions according to different standards of optical discs.

Here, as shown in FIG. 1, the spherical aberration correcting unit 1 is a mechanism in the optical pickup 40, so any physical interference with the disc insertion through the disc insertion unit 60 is not worth due consideration. During emission of laser beams, if the movable lens 2 in the spherical aberration correcting unit 1 is at an incorrect position, and the disc may be damaged due to abnormal light emission. However, as shown in FIG. 2, the initial position setting (S12) of the movable lens 2 in the spherical aberration correcting unit 1 is completed at the time of laser beam emission. Therefore, no problem occurs even though laser beams are emitted right after a disc is inserted.

The start timing for the initial position setting can be any timing between the disc insertion and the emission of laser beams. However, it is desirable to set the start timing for the initial position setting in order to shorten the amount of time spent in the optical disc loading to the disc discrimination and to be able to emit laser beams immediately after the disc is inserted. To shorten the time efficiently by benefiting from the disc insertion, it is desired to perform the initial position setting of the movable lens almost concurrently with the disc insertion.

The initial position of the movable lens in the position setting step (S12) is determined depending on the standard of a disc used. In case of the optical disc apparatus based on optical discs of at least three standards, when moving the movable lens in the spherical aberration correcting unit for recognizing an optical disc, it is desirable to set the initial position of the movable lens so that the movable lens can be moved stepwise in one direction. In this manner, the movement distance of the movable lens for recognizing an optical disc is shortened and thus, the time for recognizing an optical disc can be reduced.

Figure 3A:
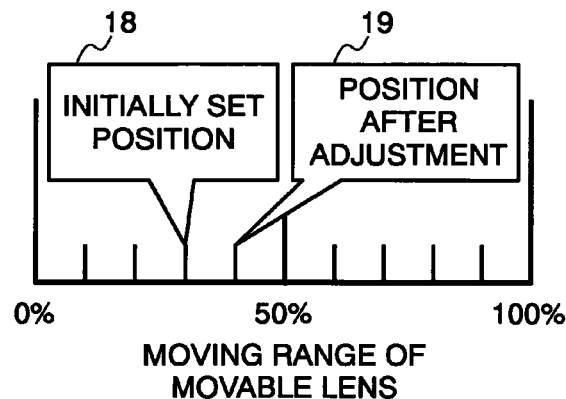
FIG. 3A is a conceptual diagram showing the position of a movable lens in the spherical aberration correcting unit, and FIG. 3B diagrammatically shows positions of the movable lens in each step of the disc loading process.
Figure 3B:
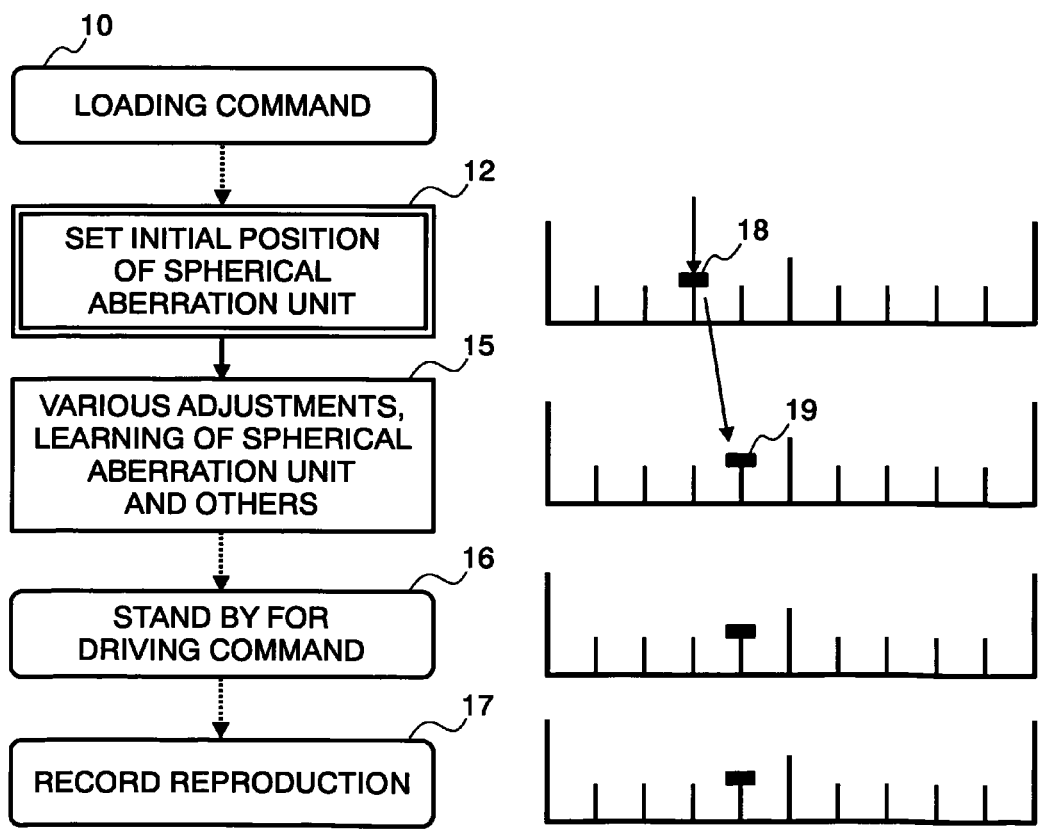

A relation between the above-described process flow and the position of the movable lens in the spherical aberration correcting unit will now be explained with reference to FIGS. 3A and 3B. In detail, FIG. 3A is a conceptual diagram showing the position of the movable lens within its movement range in the spherical aberration correcting unit, and FIG. 3B is a conceptual diagram showing positions of the movable lens in each step of the disc loading process. In FIG. 3, the horizontal axis indicates a range of physical movement of the movable lens expressed in percentage.

As depicted in FIG. 3B, when the optical disc apparatus performs the initial position setting (S12) of the movable lens in the spherical aberration correcting unit in response to a loading command, the movable lens moves to the initial position 18. For example, in FIG. 3B, the movable lens is positioned at 30% of the full range of movement. Next, laser beams are emitted (not shown), and adjustment and learning (S15) of the servo system and/or signal processing system inclusive of the movable lens and others in the spherical aberration correcting unit are carried out. Particularly, the movable lens in the spherical aberration correcting unit moves to a position 19 after adjustment, and the apparatus enters the standby mode (S16) for an operation command and the actual recording and reproducing of data are performed (S17).

Figure 4:
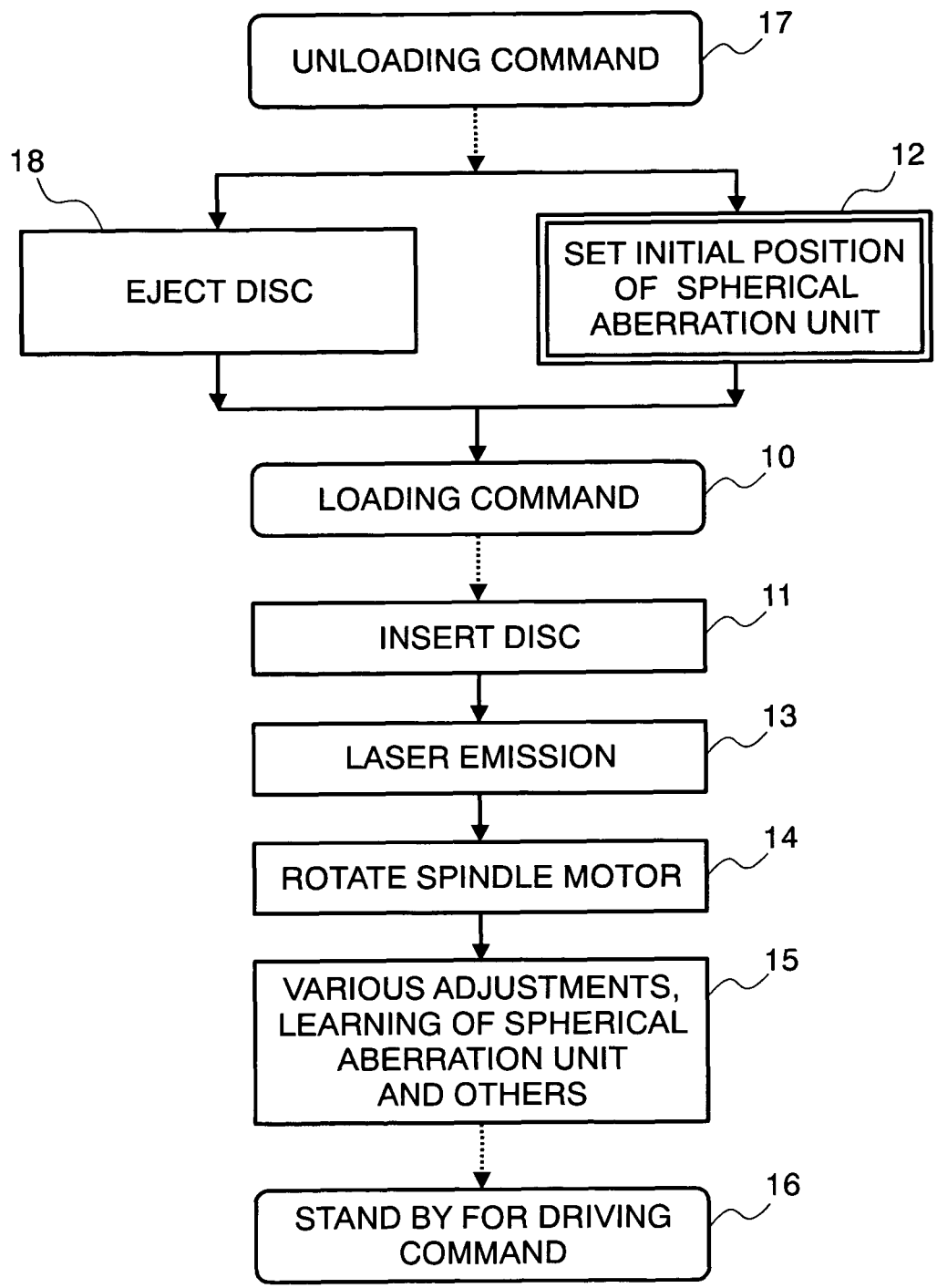
FIG. 4 is a flow chart describing another embodiment of the disc loading process for the optical disc apparatus of the present invention.

As explained before, it is desirable to complete the initial position setting (S12) of the movable lens in the spherical aberration correcting unit before the emission of laser beams, so setting during the disc unloading for example is possible. FIG. 4 illustrates that the initial position setting (S12) of the movable lens is carried out during disc unloading.

When the optical disc apparatus receives an unload command from the host (S17), it performs a disc ejection (S18). The disc ejection is an operation that a tray mounted in the optical disc apparatus is ejected from the apparatus. If a slit is formed in the disc apparatus, that is, in case of a slot loading system for inserting/ejecting a disc into/out of the slit is built in the apparatus, the disc is ejected out of the slit of the disc apparatus.

These disc ejection steps are finished within about 2 seconds, and by performing the initial position setting (S12) of the movable lens in the spherical aberration correcting unit concurrently with the disc ejection, on the outside, it will look as if the time for the initial position setting (S12) of the movable lens in the spherical aberration correcting unit is omitted. When a loading command is issued (S10) after the disc is ejected, the optical disc apparatus performs the disc injection (S11). Since the movable lens in the spherical aberration correcting unit is already set to its initial position, the apparatus sequentially performs emission of laser beams (S13), rotation of the spindle motor (S14), adjustment and learning (S15) of the servo system and/or signal processing system inclusive of the movable lens and others in the spherical aberration correcting unit, thereby entering the standby mode until the operation command is received (S16).

Figure 5A:
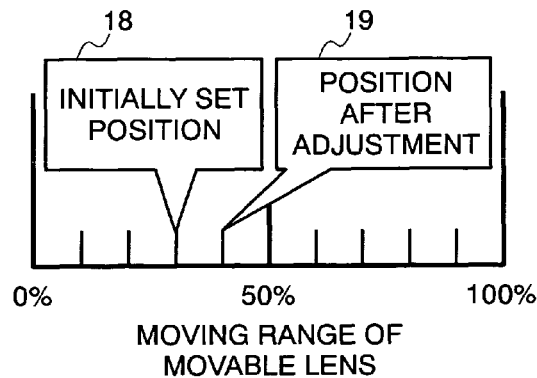
FIG. 5A is a conceptual diagram showing the position of a movable lens in the spherical aberration correcting unit, and FIG. 5B diagrammatically shows positions of the movable lens in each step of the disc loading process.
Figure 5B:
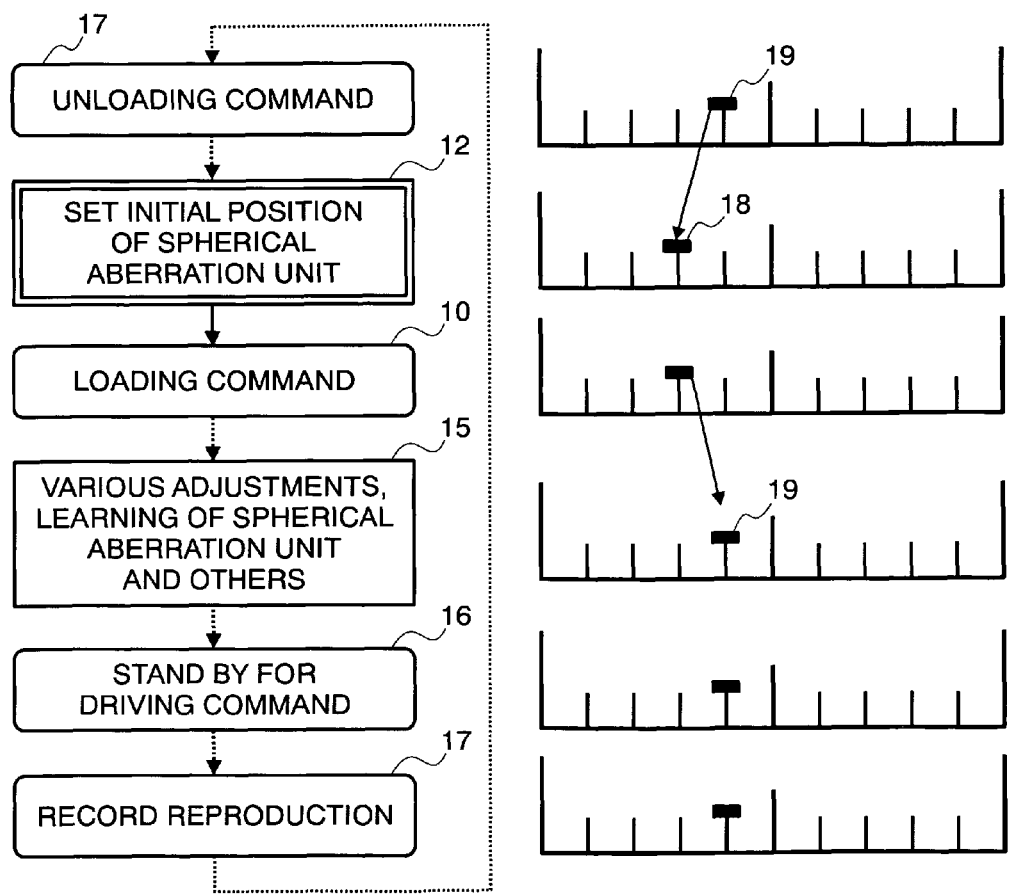

A relation between the above-described process flow and the position of the movable lens in the spherical aberration correcting unit will now be explained with reference to FIGS. 5A and 5B. In detail, FIG. 5A is a conceptual diagram showing the position of the movable lens within its movement range in the spherical aberration correcting unit, and FIG. 5B is a conceptual diagram showing positions of the movable lens in each step of the disc loading process.

When an unloading command is issued from the host (S17), the movable lens in the spherical aberration correcting unit is at the position 19 after adjustment. As the disc ejection proceeds, the movable lens in the spherical aberration correcting unit moves to the predetermined initial position 18 during the initial position setting step (S12). Next, when a loading command is issued form the host (S10), the optical disc apparatus inserts the disc (not shown), emits laser beams (not shown), and adjusts/learns (S15) the servo system/signal processing system inclusive of the movable lens and others in the spherical aberration correcting unit. The movable lens in the spherical aberration correcting unit moves to the position 19 after adjustment, enters the standby mode until an operation command is issued (S16), and performs data recording/reproduction (S17) in response to the command.

As aforementioned, there are plural methods for moving the movable lens in the spherical aberration correcting unit, such as, a piezo actuator, a stepping motor and the like is used to drive the movable lens. Since these driving elements cannot memorize an absolution position of the movable lens within their operational ranges, it is not possible to figure out the absolution position from outside. Therefore, a collimator for example serves to output the absolute position of the movable lens to outside. In addition, as the spherical aberration correcting unit needs to be loaded in the optical pickup, there is a problem involving a loading space and cost. Thus, instead of memorizing the absolute position of the movable lens through the collimator, a drive voltage for a switching unit, a piezo actuator or a stepping motor as the driving element to make the absolute zero position as reference is counted as a pseudo of the absolution position of the movable lens to outside. In the spherical aberration correcting unit provided with such switching structure, the absolute position of the movable lens is not guaranteed when the power is ON. Therefore, it is necessary to detect the absolute zero position before the movable lens in the spherical aberration correcting unit moves to the initial position after power is ON. Here, the absolute zero position is a limit of the physical movement of the movable lens, or a predetermined, unchanging position set within the apparatus.

FIGS. 6A and 6B show, respectively, a conceptual diagram of a relation among the positions of the movable lens in the spherical aberration correcting unit, and a conceptual diagram of a relation between a disc loading process flow performed in the optical disc apparatus in present invention having a spherical aberration correcting unit with a switching unit that shows an absolute zero position and the position of a movable lens in the spherical aberration correcting unit. As shown in the drawings, when a loading command is issued from the host (S10), the apparatus inserts a disc (not shown). At the same time, to detect the absolute zero position of the movable lens in the spherical aberration correcting unit, the movable lens moves to an absolute zero position 21. Later, the apparatus performs the position setting to a predetermined initial position (S12), and moves the movable lens again to a position after adjustment which was predetermined according to the unevenness of the apparatus. Subsequently, the apparatus emits laser beams (not shown), and adjusts/learns the servo system/signal processing system (S15) inclusive of the movable lens and others in the spherical aberration correcting unit. The movable lens in the spherical aberration correcting unit moves to the position 19 after adjustment, and the apparatus enters the standby mode (S16) until an operation command is issued and performs data recording/reproduction (S17) in response to the command.

In short, in the optical disc apparatus having the spherical aberration correcting unit with the switching unit showing the absolute zero position, by performing the disc insertion concurrently with moving the movable lens in the spherical aberration correcting unit to the absolute zero position 21, and the position setting to the predetermined initial position (S12), consequently, on the outside, it looks as if the processing time is omitted, thereby the amount of time for carrying out these steps is reduced. Even though in this embodiment the apparatus performs the disc insertion concurrently with moving the movable lens in the spherical aberration correcting unit to the absolute zero position 21 and the position setting (S12) to the predetermined initial position, it is desirable to complete the initial position setting (S12) of the movable lens in the spherical aberration correcting unit before emitting laser beams. For example, the initial position setting (S12) can be performed during unloading the disc.

The initial position of the movable lens in the spherical aberration correcting unit is determined or fixed according to the unevenness of the apparatus, not by the disc being inserted. However, during the disc ejection, the initial position of the movable lens is not fixed depending on the medium standard being used. In detail, when the disc is ejected, the position of the movable lens in the spherical aberration correcting unit is recorded, for example, in a memory unit installed in the optical disc apparatus or in a memory unit installed in the optical pickup, and the position stored is compared with the initial position being set. Thus, the initial position of the movable lens in the spherical aberration correcting unit is set by correcting the difference therebetween.

Besides the optical disc apparatus of the power loading system for inserting/ejecting a disc based on a tray loading or slot loading system, the present invention is also applicable to an optical disc apparatus having a cartridge in which a disc is inserted thereinto or ejected therefrom. Moreover, the present invention can be applied to an optical disc having a disc loading/removing unit, in which a cover member may be popped open up for example and the disc may be loaded/removed from the top of the apparatus.

In the present invention, the disc loading/removing unit indicates all types of structures that enable a user to remove an optical disc from the top of the apparatus by opening/closing a disc loading unit or a cover member through which the disc was inserted into the apparatus. In case of the optical disc apparatus where a user loads a disc by opening/closing the cover member, the movable lens in the spherical aberration correcting unit may proceed while the cover member is being closed.

In addition, in the optical disc apparatus, after a disc shaped recording medium finished with data recording/data reproduction is ejected from the optical disc apparatus by a disc loading/removing unit (for example, a disc loading unit), a disc shaped recording medium of a different standard is loaded. Then, the optical disc apparatus may move the movable lens in the spherical aberration correcting unit to a position for recording/reproducing data onto/from the recording medium of this new standard. For instance, when a DVD finished with data recording/data reproduction is ejected from the optical disc apparatus, the position of the movable lens in the spherical aberration correcting unit in this case is protected and kept at a DVD recording/reproducing position. When a disc shaped recording medium with a different standard from the DVD, e.g., BD, is loaded in the apparatus, the position of the movable lens may be moved to a BD recording/reproducing position during the disc loading step.

Therefore, upon exchanging a disc shaped medium with another, by always moving the movable lens to a position for recording/reproducing a new standard disc shaped medium, it becomes possible to reduce the time a conventional disc apparatus usually spent to recognize a disc of a different standard after the disc is exchanged. Although the above described the setting of the movable lens to a BD recording/reproducing position after changing the disc, the present invention is not limited thereto. For example, depending on usage frequency of a certain type of recording medium, the position of the movable lens can be set to a DVD or CD recording/reproducing position. This position setting process can be finished in advance in the optical disc apparatus, or a user may manually set the position whenever necessary.

Also, the above illustrated a case that when the DVD finished with data recording or data reproduction is ejected from the optical disc apparatus, the position of the movable lens in the spherical aberration correcting unit was protected and kept at the DVD recording/reproducing position However, the present invention is not limited thereto. That is, although the position of the movable lens is set to a certain position, it may freely move to another position while a new disc is being loaded for data recording/data reproducing onto/from the disc shaped medium newly loaded. Further, as aforementioned, the movement of the movable lens should preferably be completed by the laser beam emission.

As explained so far, according to the present invention, the data recording or data reproduction operation proceeds immediately by reducing the disc recognition time, user convenience of the optical disc apparatus can be improved.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An optical disc apparatus for recording information onto a plurality of disc shaped mediums of different standards or reproducing information from the plurality of disc shaped mediums, comprising:
   an optical pickup equipped with a spherical aberration correcting unit using a movable lens; and
   a disc insertion unit for inserting and ejecting the disc shaped mediums,
   wherein the spherical aberration correcting unit starts movement of the movable lens to an initial position during insertion of the disc shaped medium by the disc insertion unit,
   wherein the spherical aberration correcting unit carries out the movement of the movable lens to the initial position concurrently with disc insertion by the disc insertion unit,
   wherein no physical interference occurs between the spherical aberration correcting unit and disc insertion by the disc insertion unit,
   wherein the initial position is a predetermined reference position set by the standard of one disc shaped medium amount from among the plurality of disc shaped mediums, and
   wherein after the completion of the disc insertion, the optical disc apparatus discriminates the disc shaped medium by emitting the laser beam from the optical pickup onto the disc shaped medium in the setting of the moveable lens of the spherical aberration correcting unit being positioned on the initial position.

2. The apparatus as set forth in claim 1, wherein the disc insertion unit is of a tray loading system.

3. The apparatus as set forth in claim 1, wherein the disc insertion unit is of a slot loading system.

4. The apparatus as set forth in claim 1, wherein the plurality of disc shaped mediums consist of at least two types of disc shaped mediums of CD standards, disc shaped mediums of DVD standards, and disc shaped mediums of BD standards.

5. An optical disc apparatus for recording information onto a plurality of disc shaped mediums of different standards or reproducing information from the plurality of disc shaped mediums, comprising:
   an optical pickup equipped with a spherical aberration correcting unit using a movable lens; and
   a disc insertion unit for inserting and ejecting the disc shaped mediums,
   wherein the apparatus stores a position of the movable lens in the spherical aberration correcting unit during the ejection of the disc shaped medium,
   wherein the spherical aberration correction unit starts movement of the movable lens to an initial position during insertion of the disc shaped medium by the disc insertion unit,
   wherein the spherical aberration correction unit carries out the initial position setting of the movable lens based on a difference between the stored positions at the time of the disc ejection and the initial position concurrently with the disc insertion unit inserting the disc shaped medium.

6. The apparatus as set forth in claim 5, wherein the plurality of disc shaped mediums consist of at least two types of disc shaped mediums of CD standards, disc shaped mediums of DVD standards, and disc shaped mediums of BD standards.

7. An optical disc apparatus for recording information onto a plurality of disc shaped mediums of different standards or reproducing information from the plurality of disc shaped mediums, comprising:
   an optical pickup equipped with a spherical aberration correcting unit using a movable lens; and
   a disc loading/removing unit for loading/removing the disc shaped mediums, wherein the spherical aberration correcting unit starts the movement of the movable lens to an initial position during loading of the disc shaped medium by the disc loading/removing unit;
   wherein the spherical aberration correcting unit carries out the movement of the movable lens to the initial position concurrently with the loading of the disc shaped medium by the disc loading/removing unit,
   wherein no physical interference occurs between the spherical aberration correcting unit and the loading of the disc shaped medium by the disc loading/removing unit,
   wherein the initial position is a predetermined reference position set by the standard of one disc shaped medium among the plurality of disc shaped mediums, and
   wherein after the completion of the loading of the disc shaped medium, the optical disc apparatus discriminates the disc shaped medium by emitting the laser beam from the optical pickup on the disc shaped medium in the setting of the movable lens of the spherical aberration correcting unit being positioned on the initial position.

8. The apparatus as set forth in claim 7, wherein the plurality of disc shaped mediums consist of at least two types of disc shaped mediums of CD standards, disc shaped mediums of DVD standards, and disc shaped mediums of BD standards.

9. A driving method of an optical disc apparatus for recording information onto a first recording medium of a first standard and a second recording medium of a second standard, or reproducing information from the first recording medium and the second recording medium, the optical disc apparatus comprising an optical pickup equipped with a spherical aberration correcting unit using a movable lens; and a disc loading/removing unit for loading/removing the first recording medium and the second recording medium, the method including the steps of:
   ejecting, in the disc loading/removing unit, the first recording medium finished with information recording or information reproduction from the optical disc apparatus; and
   starting the movement of the movable lens in the spherical aberration correcting unit, during loading of the second recording medium in the optical disc apparatus, to a position for recording/reproducing information onto/from the second recording medium, wherein no physical interference occurs between the spherical aberration correcting unit and loading of the second recording medium in the optical disc apparatus;
   moving the moveable lens concurrently with the loading of the second recording medium in the optical disc apparatus to a position for recording/reproducing information onto/from the second recording medium, and after the completion of the loading of the second recording medium, discriminating the second recording medium by emitting the laser beam from the optical pickup onto the second recording medium in the setting of the movable lens of the spherical aberration correcting unit being positioned on the position for recording/reproducing information onto/from the second recording medium.

10. The method as set forth in claim 9, wherein, during the loading of the second recording medium, the movement of the movable lens starts from a position for recording/reproducing information onto/from the first recording medium to a position for recording/reproducing information onto/from the second recording medium.

11. The method as set forth in claim 10, wherein the first recording medium and the second recording medium are selected from any of CDs, DVDs and BDs.

\* \* \* \* \*